April 16, 1963

E. G. PERRY 3,085,845

APPARATUS FOR RECORDING GEOPHYSICAL SIGNALS ON A DEPTH BASIS

Filed Oct. 28, 1957

INVENTOR.
EDWARD GORDON PERRY

BY

Samuel M. Mims Jr.

ATTORNEY

April 16, 1963 E. G. PERRY 3,085,845
APPARATUS FOR RECORDING GEOPHYSICAL SIGNALS ON A DEPTH BASIS
Filed Oct. 28, 1957 3 Sheets-Sheet 3

INVENTOR.
EDWARD GORDON PERRY
BY
*Samuel M. Mims Jr.*
ATTORNEY

United States Patent Office 3,085,845
Patented Apr. 16, 1963

3,085,845
APPARATUS FOR RECORDING GEOPHYSICAL
SIGNALS ON A DEPTH BASIS
Edward Gordon Perry, Dallas, Tex., assignor to Texas Instruments Incorporated, Dallas, Tex., a corporation of Delaware
Filed Oct. 28, 1957, Ser. No. 692,902
28 Claims. (Cl. 346—33)

This invention relates to a method of and apparatus for producing signal information records and more particularly to a method of and apparatus for obtaining charts or seismograms on which seismic signals are recorded positionally thereon proportional to depth rather than time.

In seismic surveying, it is common practice to generate seismic waves by the detonation of an explosive charge located either on or above the surface of the earth or in a hole drilled in the earth. On detonating the charge, the waves generated thereby travel in multiple paths including paths into the earth. The waves traveling into the earth are reflected back to the surface thereof from layers where a change in velocity occurs and are there detected by seismometers, or groups of seismometers, spaced apart from each other. The seismometers convert the detected seismic waves into electrical signals which are then amplified and recorded. The recording may be initially on a visible type record or, as is the more common practice at present, on a reproducible type record such as a magnetic medium. The reproducible type recording method has the advantage that the signals can be reproduced at will in order to permit the signals to be analyzed and corrected, statically and dynamically, prior to being recorded on a visible type record.

Visible type recordings of seismic signals have been and are being made, almost universally, by means of the seismic camera, well known in the prior art. Electrical signals, whether received directly from the amplifiers associated with the seismometers or groups of seismometers or from individual seismic traces previously recorded on a reproducible type record, are fed to galvanometers mounted in the camera. There is generally a separate galvanometer to record the output from each seismometer, each group of seismometers, or each trace on a reproducible type record, as the case may be. These signals cause the galvanometer coils to deflect in accord with the frequency and amplitude of the signals and a mirror, mounted on the coil, reflects a beam of light to a photographic medium, which beam of light is thus representative of the frequency and amplitude of the electrical signals. The photographic medium is driven at a constant speed and a slotted timing drum, driven at a constant speed but not necessarily at the speed of the photographic medium, directs a transverse beam of light to the medium at uniform time intervals. Thus, there is produced a record which, upon development, reveals a seismic record with the seismic signals recorded positionally thereon with respect to time.

It has been recognized that such prior art records are not very satisfactory due to the fact that the seismic signals generated in the earth travel at varying velocities depending upon the density of the earth strata. That is, the earth strata near the surface are less dense than the deeper strata and the seismic waves travel at a lower velocity than do the seismic waves traveling in the deeper and more dense earth strata. Thus, a seismic record made at constant speed and with uniform time lines thereon may indicate for a given time interval a wave travel distance of, for example, 75 feet in a near-surface strata whereas the same time interval may represent a wave travel distance of 300 feet at a deeper strata. Since it is ultimately desired to know the depth of the strata producing the seismic signals of interest, it has been necessary in the prior art to convert chart times to depth by laborious and time consuming manual and mental processes to arrive at the desired information.

In accordance with the present invention, it has been found that seismic records proportional to depth may be produced by utilizing a drive to the chart which produces a chart velocity proportional to the actual velocity of the seismic signals in the earth. Thus, the seismic signals appearing on the chart will be recorded at a position proportional to the actual depth of the strata in the earth reflecting those signals. Moreover, by placing equally spaced transverse lines on a chart so driven, a convenient scale may be produced to read these depths directly. In other words, the lines on the chart will then be representative of positions of depth rather than time as is customary in the art. A linear vertical cross section of the subsurface terrain is thereby obtained which greatly simplifies the analysis of the test data.

In the preferred embodiment of the present invention, the output of a differential is used to drive a chart drive roller so that a chart may be driven at a speed proportional to actual velocity of the seismic signals in the earth. One input to the differential is at constant velocity from a gear drive that will satisfy any depth or velocity requirements and a second input to the differential is provided by a function generator. The latter input may be programmed in accordance with known information obtained from velocity tests on a given terrain.

Therefore, it is an object of the present invention to provide a method of and apparatus for producing geophysical records in terms of depth rather than in terms of time.

Another object of the present invention is to provide a variable speed device to drive a chart on which geophysical records are produced.

A further object of the present invention is to incorporate sufficient flexibility into the chart drive to permit a given function generator to suffice for a plurality of depths.

A still further object of the present invention is to provide a differential drive to the chart thereby driving the chart at a speed proportional to the actual velocity of the geophysical signals in the ground.

An additional object of the present invention is to provide a function generator to supply an input to the differential such that the output of the differential is proportional to the actual velocity of the geophysical signals.

A more particular object of the present invention is to supply a variable time delay so that the function generator becomes operative at the desired reference plane.

It is also an object of the present invention to provide a depth camera that may also be run as a time camera.

An aditional object of the present invention is to provide an infinitely variable drive to accommodate any depth or velocity requirements.

Another desired object of the present invention is to provide a time check against the depth lines along the edges of the chart.

Other objects and advantages of the present invention will become readily apparent upon consideration of the following detailed description when taken in conjunction with the drawings in which.

Figure 1:
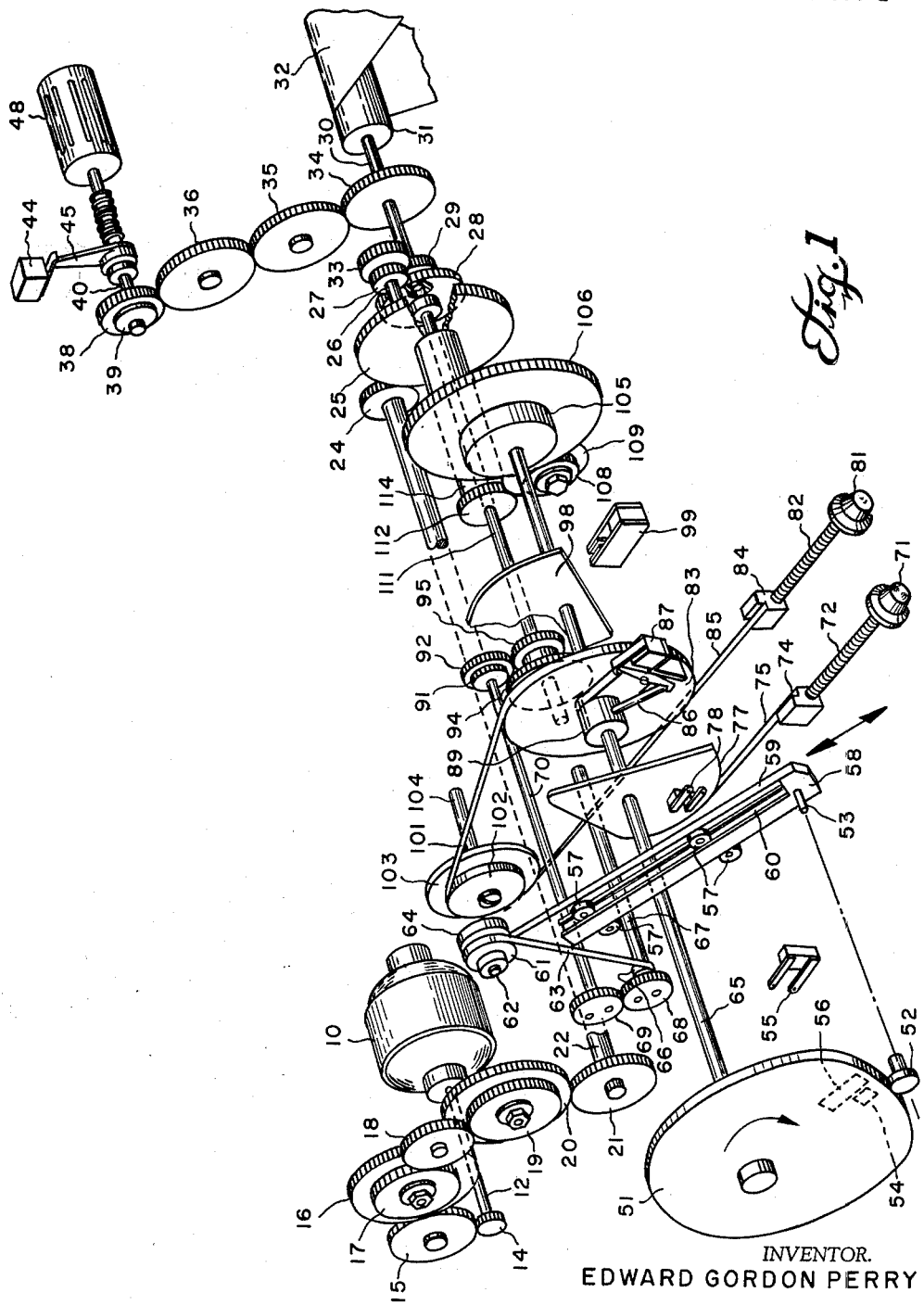
FIG. 1 shows, in perspective, a drive mechanism for driving the chart in accordance with the present invention.

Referring now to FIG. 1, a synchronous motor 10 is shown with pinion gear 14 fixedly attached to shaft 12. Pinion gear 14 drives output gear 21 on a constant velocity shaft 22 through the gear train comprising gears 15, 16, 17, 18, 19, and 20. Idler gears 15 and 18 are fiber gears to reduce gear noise in the system. The ratio of mating gears in the chain including gears 16, 17, 19, 20 and 21 may be changed at will to provide different constant speeds to shaft 22. Coarse changes in the speed may be made by using various size gears for the pinion gear 14 and small or vernier changes in the speed may be made by using various size gears for the gears 16, 17, 19, 20 and 21.

Gear 24 at the opposite end of shaft 22 engages differential gear 25 to transmit the rotation of output shaft 22 to the differential. Differential gear 25 is part of a cluster of gears which includes gear 112 connected to gear 25 by cylindrical member 114. Both gear 25 and gear 112 are rotatably mounted on shaft 111. Mounted on the side of differential gear 25 remote from cylindrical member 114 is a shaft 26 which carries rotatable gears 27 and 33. The latter gears mesh with and rotate around differential gears 28 and 29 respectively. Differential gear 28 is fixedly attached to shaft 111 and differential gear 29 is rigidly mounted on shaft 30. A paper drive roller 31 is mounted on the end of control shaft 30. A seismogram or chart 32 is advanced by the rotation of paper drive roller 31 and another feed roller (not shown) which frictionally engages paper drive roller 31.

A gear 34 is securely mounted to shaft 30 between gear 29 and paper drive roller 31. This gear 34 drives a depth drum 48 having a slotted periphery and mounted on shaft 40 longitudinally spaced from control shaft 30 and connected through gears 35, 36, and 38 to put depth lines on chart 32 in a manner to be described hereinafter.

The means for imparting a variable velocity input to the differential gears 28, 29, and control shaft 30 will now be described. Cluster gear 112 which received a constant speed from synchronous motor 10 drives depth gear 109. Depth gear 108 is mounted on the same shaft as depth gear 109 and rotates in unison therewith. Depth gear 108 meshes with gear 106 on shaft 65 at the opposite end of which is fixedly mounted a function generator shown as cam 51. Gears 108 and 109 are designated as depth gears because their size determines how fast the function shall be generated. Cam roller 52 follows the contour of cam 51 and is resiliently urged thereagainst through the medium of shaft 53 and cam follower 58 which is normally biased in a direction to maintain roller 52 in contact with cam 51 by any suitable means (not shown). Cam follower 58 is provided with grooves 60, one of which is shown in perspective in FIG. 1. Two pair of wheels 57 suitable mounted for rotation in a standard (not shown) engage grooves 60 to permit free inward and outward movement of the cam follower 58. Flexible strap 59 on cam follower 58 is substantially parallel to grooves 60 and attached tangentially to a wheel 64 which is mounted on a shaft 62. Also fixedly mounted on shaft 62 is a second wheel 61. One end of a flexible strap 63 is attached tangentially to wheel 61 and the other end is fastened to acceleration wheel 66 which is mounted to rotate on shaft 67. Strap 63 is maintained taut on acceleration wheel 66 by the input to differential gear 25. A different size diameter for acceleration wheel 66 may be substituted to vary the effective lift of cam 51 in a manner to be described hereinafter. The amount of rotation imparted to acceleration wheel 66 is transmitted by gear 68 mounted on shaft 67 to gear 69 on shaft 70 which parallels shaft 67. The rotation is then transmitted to a two speed transmission consisting of gears 91 and 92 on shaft 70 and gears 94 and 95 on shaft 111. Rotation of shaft 111 causes rotation of differential gear 28 which is fixedly mounted to the opposite end of shaft 111. Rotation of differential gear 28 is transmitted to control shaft 30 through gears 27, 33, and 29. It is in this manner that a variable velocity input is supplied to the differential gears 28, 29 and control shaft 30. The gear arrangement including gears 28, 27, 33, and 29 may be identified as a "velocity compensating means" which is operated from a "predetermined velocity function generator means" which includes cam 51, follower 58, strap 59, acceleration wheel 66 and gears 68, 69, 91, 95, shaft 111 and associated parts.

The apparatus of the present invention is provided with a function delay mechanism and an adjustment therefor which will presently be explained. Cam 51 is provided with a circular portion and a lift portion. The circular portion causes no reciprocation of cam follower 58. The lift portion does cause reciprocation of cam follower 58 and ultimately an input to differential gear 28. Therefore, the lift portion is the function portion of the cam. The purpose of the function delay mechanism is to determine how long after the start signal is received that the cam shall rotate on its circular portion. The start signal is usually the explosion of dynamite, commonly referred to as the time break. Shaft 65 which carries function generator 51 and a drive gear 106 at the opposite end thereof is driven by an electrical clutch 105 with either a mechanically or electrically applied bias. Prior to the starting signal clutch 105 is partially energized to cause rotation of shaft 65 to its starting position with relatively low torque. A wheel 83, rotatable on shaft 65, is shown positioned between function generator 51 and clutch 105. The position of wheel 83 on shaft 65 is adjusted by a strap 101 which is fixedly attached to wheel 83 on shaft 65 and to wheel 102 which is rigidly mounted on parallel shaft 104. A return strap 85 is attached to wheel 103 adjacent wheel 102 and leads to slidable block 84. Rotation of a dial 81 turns micrometer lead screw 82 and adjusts the position of slidable block 84. A change in position of block 84 causes a corresponding rotation of shaft 104 which rotation is transmitted to shaft 65 through flexible member 101. In order for this motion to be transmitted from block 84 to shaft 65 any suitable spring means on wheel 83 (not shown) may be used to maintain straps 85 and 101 taut. Arm 86 projects from a hub 89 mounted rigidly to shaft 65. A relay 87 is mounted to wheel 83 and carries a catch mechanism which stops arm 86 when relay 87 is deenergized. It is apparent then that the catch mechanism determines the position at which arm 86 is stopped. This in turn controls the position of shaft 65 and cam 51.

Prior to the starting signal, relay 87 is de-energized so that arm 86 will be stopped by contact with the catch mechanism associated with relay 87. The resistance to torque between arm 86 and the arm of relay 87 is sufficient to overcome the driving force of the clutch 105 so that shaft 65 is held in a predetermined position. The adjustment for the function delay mechanism determines where this position shall be.

Arm 86 normally stops in contact with the catch on relay 87 at the end of the last record. If this should not occur or if the adjustment of knob 81 should cause wheel 83 and relay 87 which is mounted on wheel 83 to advance in a clockwise rotation, arm 86 is then brought in contact with the catch on relay 87 as soon as synchronous motor 10 is started.

Relay 87 releases arm 86 when the starting signal is applied. Simultaneously clutch 105 is completely energized to give positive rotation to shaft 65 and cam 51. This starting signal is usually the time break, but it can also be an independent signal if it bears some fixed relationship with the data recorded.

The purpose of the function delay mechanism just described is to determine how much of the circular portion of cam 51 is to be employed. At the occasion of the starting signal, relay 87 is energized which releases the catch mechanism and permits arm 86 and shaft 65 to turn freely. During this time the cam roller 52 is following the circular portion of cam 51. Contacts 54 and 56 which are shown on cam 51 are brought into sliding contact with switch 55. When switch 55 is closed, power is supplied to a standard galvanometer circuit and a positive voltage to one of the galvanometers deflects the galvanometer to mark the beginning of the function on chart 32.

A means for varying the position at which depth lines begin to occur on the chart 32 will now be described. A sector plate 77 holding switch 78 is fixedly attached to shaft 61. Attached substantially tangentially to the bottom portion of sector plate 77 is a nonstretchable resilient strap 75. The other end of strap 75 is attached to a slidable block 74. Dial 71 turns micrometer lead screw 72 to vary the position of slidable block 74. This motion is transmitted substantially tangentially to sector plate 77. Switch 78 rotates with sector plate 77 which in turn rotates with shaft 65 until switch 78 is closed by contacts 54 and 56 on cam 51. Although sector plate 77 and function generator 51 are shown to be a considerable distance apart to facilitate showing the operation of cam follower 58, they are in the actual embodiment in close proximity so that switch 78 may touch contacts 54 and 56. Circuit means are provided to energize a relay 44 which until this time has contacted arm 45 of shaft 40 and prevented the depth drum 48 from rotating. Previous to the energization of relay 44, a friction clutch 39 permitted gear 38 to rotate without causing rotation of shaft 40. Thus, upon release of arm 45, gear 38 on shaft 40 no longer slips with respect to clutch 39 but is driven therewith. Therefore, depth drum 48 begins to rotate and to place depth lines on chart 32.

Means are also provided on shaft 65 for braking it during the early part of the cycle when the pressure from the cam follower 58, transmitted by shaft 53 to cam roller 52 tends to drive the cam 51. The purpose of the braking operation is to prevent backlash in the gears from cam 51 to the cam input to the differential when the cam causes a reversal of motion. Partial plate 98 when passing through friction clamp 99 causes a braking action to be imparted to shaft 65. This is required since during the early portion of the cycle the geophysical signal is passing through the less dense layers in the earth where the velocity is less than in the deeper and more dense layers. Therefore, the output of the cam 51 tends to supply a velocity which detracts from the average velocity supplied through the synchronous motor to gear 25. When cam 51 is performing positive work, this braking action is no longer required. Therefore, the plate 98 encompasses less than a full revolution and is designed to provide a braking action only when the cam follower 58 tends to drive cam 51. In the rotational position shown in FIG. 1, roller 52 is approximately at the mid-point of a circular portion of cam 51. FIG. 1 also shows that at this time plate 98 has not yet begun to pass through friction clamp 99 to provide a braking action.

Figure 2:
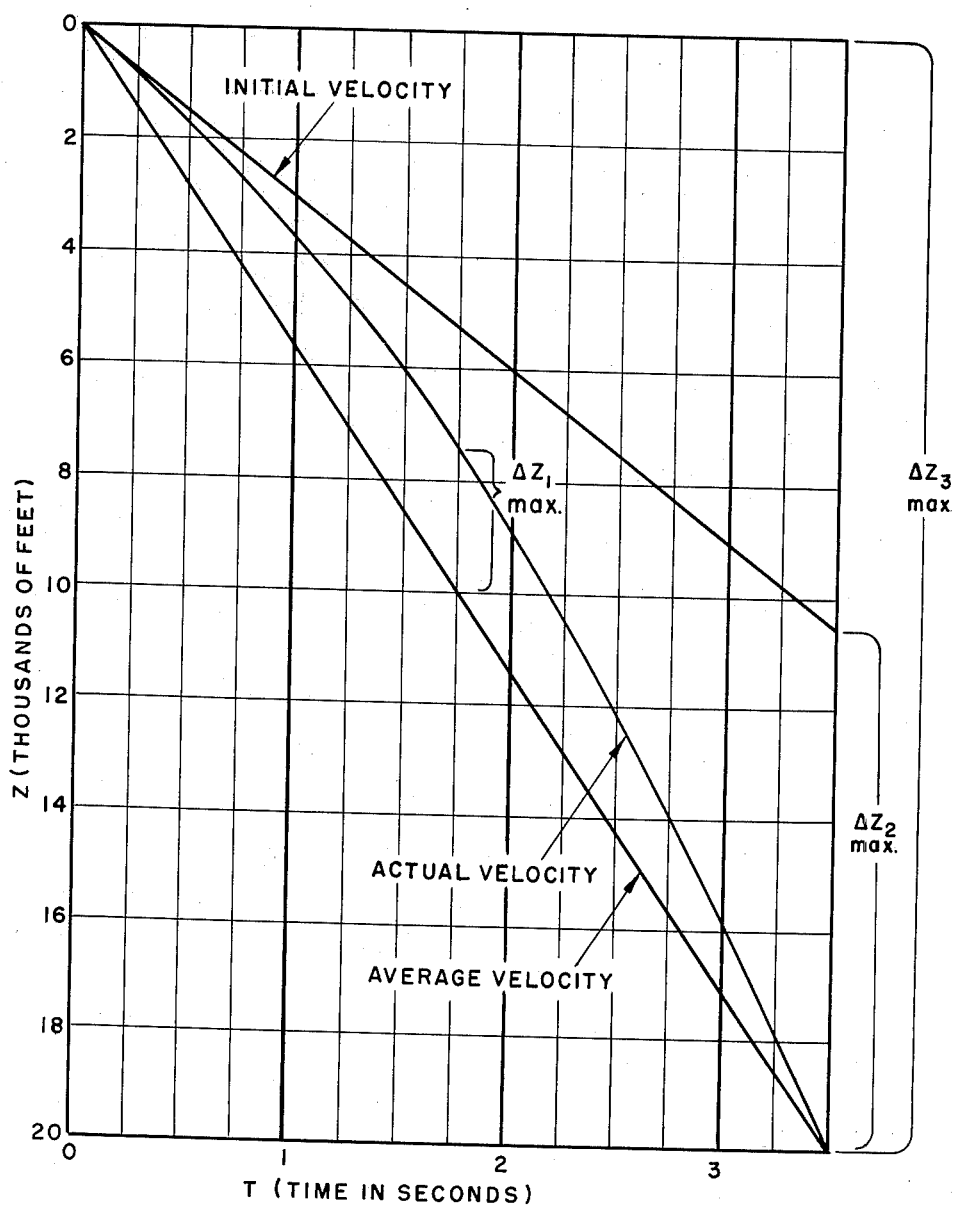
FIG. 2 is a graph of some typical time versus depth curves.

Referring now to FIG. 2, a graphical illustration is presented of the principles relied upon to achieve time-to-depth conversion in the camera of this invention. Three time-depth curves are shown in FIG. 2 in which depth, in thousands of feet, is plotted against time, in seconds. The upper curve is plotted as a constant velocity curve equal to the initial velocity of the geophysical signals in the ground. The middle curve, labeled actual velocity, is the rate at which paper drive roller 31 should be driven with time to obtain a record of signals related to actual depth. The lower curve is plotted at constant velocity with time and corresponds to the average velocity of the geophysical signals between the datum plane and the total depth. The input to the differential through differential gear 25 would drive chart 32 proportional to the average signal velocity, for example, at a velocity shown by the lower curve of FIG. 2. However, a second input obtained from function generator 51 is applied to gear 28 of the differential and, in the preferred form of the present invention, provides a velocity drive in the differential to drive drum 31 proportional to the difference between the average velocity and actual velocity of the geophysical signals in the ground. Because the actual velocity is less than the average velocity for a given depth during the first half of the plot and is greater during the second half thereof, as revealed in FIG. 2, this means that during the initial portion of the cycle the input to differential gear 28 will be subtracting from the input to differential gear 25 and that during the second half of the cycle it will be adding to the input to differential gear 25.

In a modified form of the present invention it is possible to use the initial velocity as the input to differential gear 25 and to supply to differential gear 28 the difference between the initial velocity curve and the actual velocity curve. Since it is the lift of the cam 51 which must supply a variable velocity input to differential gear 28 proportional to the difference between the initial velocity curve and the actual velocity curve, it can be seen by an inspection of FIG. 2 that the lift of the cam 51 would have to be considerably greater in this second embodiment. The maximum lift of cam 51 in this second embodiment must be proportional to $\Delta Z_2$ max. as compared to $\Delta Z_1$ max. in the preferred embodiment.

According to a third embodiment of the present invention, it is possible to supply the entire input to the control shaft 30 from a cam. In this form the lift of the cam 51 must supply a variable velocity input which is proportional to and varies with the distance from the top of the graph to the average velocity curve. Again an inspection of FIG. 2 shows that even greater amplitudes on the cam to be proportional to $\Delta Z_3$ max. are necessary to drive the paper drive roller 31 at a velocity proportional to the actual velocity curve in this embodiment. It should be clear that the work supplied by cam 51 is less in the preferred embodiment than in either of the alternate embodiments.

The operation of the present invention according to the preferred embodiment thereof will presently be explained. Pinion gear 14 and gears 16, 17, 19, 20, and 21 are selected to provide the proper average velocity input to differential gear 25 for the particular depth at which the geophysical trace is desired. The proper size diameter for acceleration wheel 66 is selected to vary the effective amplitude of cam 51. The adjustment for the function delay mechanism which is made by rotation of knob 81 is set as desired. Similarly, the depth line adjustment which is made by rotation of dial 71 is also set into the system. Power is supplied to the synchronous motor 10 which initiates a constant velocity input to differential gear 25. Since clutch 105 and relay 87 are not energized, there is no rotation of shaft 65. This means that there is no input to shaft 111 from function generator 51. Chart 32 is driven by roller 31 and another roller (not shown) at a constant speed. Time lines are placed on chart 32 by a time drum (not shown) which is similar to depth drum 48 and which is standard in the art. Relay 44 is energized so that arm 45 is in contact with the arm of relay 44 and friction clutch 39 permits shaft 40 to slip. When the charge of dynamite is set off, both clutch 105 and relay 87 are energized by suitable electrical connections thereto (not shown).

As the cam 51 rotates with the cam roller 52 on the circular portion of the cam, which is approximately 50 to 60° of the circumference, only differential gear 25 is effective in the differential since shaft 111 rotates only in response to changes in the lift of cam 51 when the straps are pulled tight. That is, the speed of chart 32 at this time is constant and is proportional to the average velocity of the geophysical signals in the ground. As cam 51 rotates beyond its circular part the torque from the differential causes cam roller 52 to maintain firm contact on cam 51 by causing strap 63 to be wound around acceleration wheel 66. This in turn allows the cam input to the differential to rotate as a direct function of the contour of the cam. The rotation of gear 68 is transmitted to gear 69, then through the two speed transmission to differential gear 28 which is the second input to the differential. The two speed transmission in effect provides a coarse change for the gear ratio of gears 68 and 69 and/or the diameter of acceleration wheel 66. The net result of differential gear 25 plus differential gear 28 determines the rotational speed of differential gear 29 which is connected by means of control shaft 30 to the paper drive roller 31.

During the first half cycle of the cam, gear 68 and differential gear 28 are rotating in a clockwise direction as viewed from the position of cam 51. The machined surface of cam 51, which allows a smooth transition from the circular portion to the function portion of the cam allows the necessary rotation of gear 68 through to differential gear 28 so that a chart speed is proportional to the initial velocity at the function start. Mechanically speaking, the clockwise rotation of differential gear 28 reduces the clockwise rotation of differential gear 27 which in turn reduces the speed of differential gear 29. Since the cam roller 52 is moving along the cam at a variable speed in response to the lift of the cam, the resultant effect on differential gear 28 is a variable speed. This variable speed of differential gear 28 plus the constant speed of differential gear 25 imparts the necessary variable speed to differential gear 29. During this first half cycle of the cam 51, brake plate 98 is engaged by friction clamp 99 to prevent the cam roller 52 from driving cam 51 ahead, which would allow slack in the gear train.

During the second half cycle of the cam 51, brake plate 98 is not engaged by friction clamp 99 as it is rotated out of contact therewith. At this time cam 51 is doing positive work in driving the cam roller 52. The motion of gear 68 during this second half cycle is counterclockwise. This motion is imparted to gear 69 through the two speed transmission to differential gear 28, whose motion is also made counterclockwise. Since differential gear 28 is now rotating opposite to differential gear 27, the speed of differential gear 27 is increased in a variable manner, thereby increasing the rotational speed of differential gear 29 and the paper drive roller 31.

The chart 32 produced by the operation of the preferred embodiment of this invention is arranged at the beginning of the record with timing lines all the way across. Then at a predetermined time the timing lines are replaced by depth lines across the record 32. However, timing line stubs are left at both edges of the record throughout its entire length. This is an additional time marker which serves as a check on motor speed. These timing stubs are continued along the edge of the record concurrently with the depth lines that extend across the record.

As an alternate mode of operation, the time depth camera may be operated strictly as a time camera. This may be accomplished by maintaining clutch 105 constantly in a de-energized condition. In this condition, shaft 65 will not be driven by synchronous motor 10 so that the only input to the differential is from the output shaft 22. In this mode of operation, differential gear 25 is rotated clockwise. Differential gear 28 is stationary. Differential gear 27 is carried around the perimeter of differential gear 28 by differential gear 25, causing clockwise rotation of differential gear 27. Differential gear 33 in turn imparts counterclockwise rotation to differential gear 29. Differential gear 25 always rotates at a constant speed and differential gear 28 is stationary, the resultant motion of differential gear 29 is a constant speed. In this mode of operation, there will be no changeover from time to depth lines across the chart. Instead time lines produced by a time drum will extend across the record throughout its length.

Although acceleration wheel 66 and wheel 61 have been shown to be circular, this is not an absolute requirement. The relative size of these two wheels provide a vernier control over the effective lift of cam 51. It is possible for either both or one of them to vary from a circular shape if the other wheel varies a proportional amount. That is, if the ratio of the radii of the two remains the same for a given peripheral displacement. For example, it is possible to use spiral wheels 66a and 61a (see FIGS. 3 and 4) for acceleration wheel 66 and wheel 61. Thus, if the rate of change per unit length of the periphery at any portion around the 360 degrees is the same, it is possible to obtain any ratio desired between the two wheels by merely attaching the tape 63 at a different point or by using a different length of tape so that it would wind around the wheel at a different position. This means that the angular position would be different at the start of these wheels. Therefore, the ratio would be different but would still be constant. If wheels 66 and 61 are made of such a shape that the rate of change is constant all the way around the spiral, it would not make any difference what portion of the spiral was used. Therefore, rotation of wheel 61 causes a proportional rate of change in wheel 66. So by merely starting the two wheels in a different rotational relationship with respect to each other, by either spreading them apart, by changing their center distance, by changing the position at which the tape is attached, by changing the length of tape, or by putting an intermediate member such as a roller that would move the tape laterally with respect to the line of centers of the two spirals the starting point may be changed. Any one of the above modes of operation could be used to change the ratio between shafts 62 and 67. Such an intermediate member for moving the tape laterally with respect to the line of centers of the two spirals could be a pulley 120 as shown in FIG. 3 to change the initial position of shaft 67 with respect to shaft 62.

Figure 3:
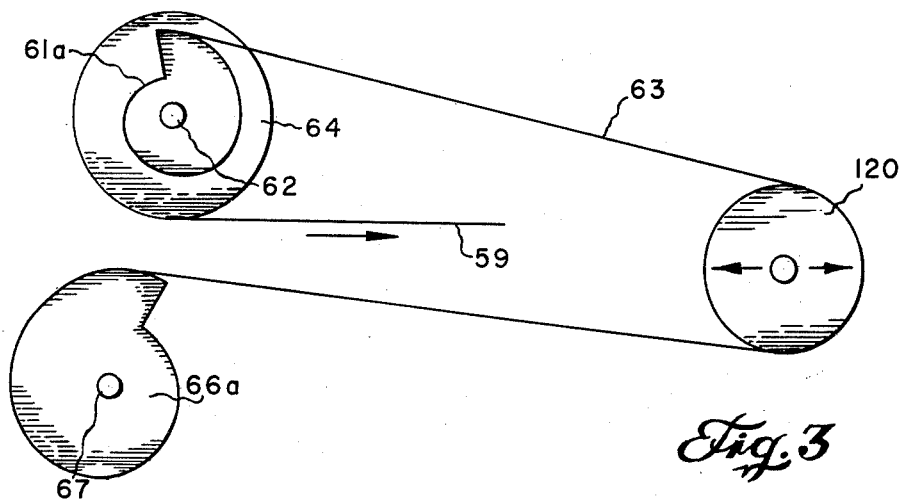
FIG. 3 is a schematic showing of a modified form of the present invention.

The preferred arrangement when using spiral wheels is shown in FIG. 3. Pulley 120 which is mounted on a movable shaft as shown is placed well out to one side from the line of centers of shafts 62 and 67 so that strap 63 is maintained essentially tangent to spirals 61a and 66a.

Figure 4:
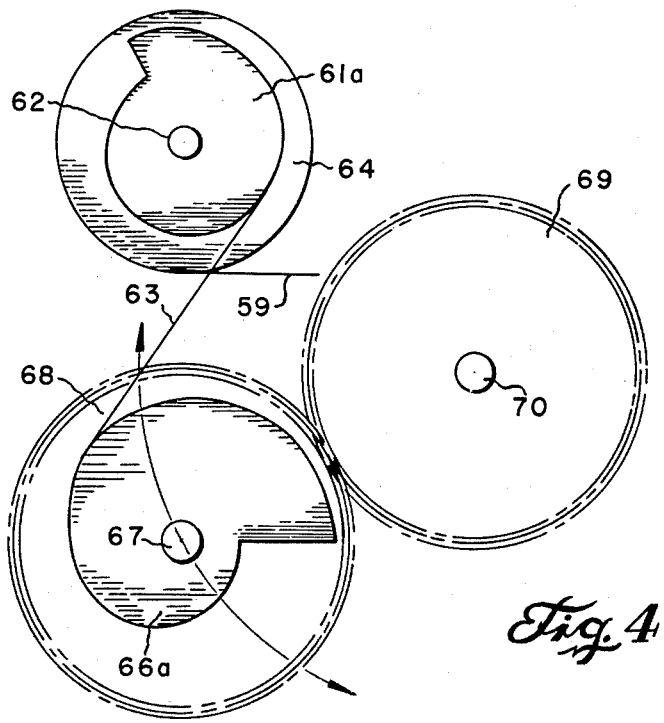
FIG. 4 is another schematic showing of a modified form of the present invention.

FIG. 4 illustrates another variation in obtaining vernier changes in the effective lift of cam 51. Spiral 61a is shown mounted on shaft 62. One end of strap 63 is attached to spiral 61a and the second end of strap 63 is attached to spiral 66a which rotates with gear 68 on shaft 67. Gear 68 is shown to be rotatable around the center of gear 69. In this manner it is possible to change the line of center distance between spiral 61a and spiral 66a. In both FIG. 3 and FIG. 4 strap 59 from cam follower 58 is shown attached to intermediate wheel 64.

It can be seen from an inspection of FIGS. 3 and 4 that a second function generator can be placed on either shaft 62 or shaft 67 to complement the function generated by cam 51.

The differential of the present invention has been described with respect to one particular form thereof, but it is obvious that any commonly used differential to which a plurality of inputs could be applied may be used to control the operation of control shaft 30. Although the differential drive has further been disclosed as driving a drive roller in reproducing seismic signals which have previously been recorded, it is to be understood that the differential drive may be used in various other applications where it is desired to simulate a given velocity function. It may also be used in the initial production of a reproducible record that is linear with depth. This may be accomplished, for example, by driving either the recording head or the recording drum proportional to the actual velocity of the seismic signals in the ground. A time-depth chart may then be produced by running the record produced, as just described, at constant speed since the time-depth correction was made in producing the reproducible record.

Another application of the differential drive disclosed in the present invention is to vary the playback speed of the reproducible record. That is, the reproducible record is played back fast when the seismic signals in the ground are slow and is played back slowly during the time when the seismic signals travel rapidly through the earth. Therefore when the reproducible record is being played back and recorded on a chart, the chart on which the played back signal is being recorded may be run at a constant speed.

An advantage in using a rotational cam as the function generator is that it makes one revolution for each record and eliminates the problem of resetting the function generator.

Though the present invention has been shown and described in specific embodiments, various changes and modifications obvious to one skilled in the art are within the scope, purpose and intent of this invention.

What is claimed is:

1. In an apparatus for recording geophysical signals travelling at predetermined actual velocities, the combination comprising a paper drive roller, a chart driven by said roller, a differential having first and second inputs, an output connected to said roller for driving said roller, a first drive input means to said differential to drive said first input at a constant speed proportional to the average velocity of said geophysical signals in the ground, and a second drive input means to said second input including a function generator to drive said second input at predetermined variable speeds proportional to the difference in speed between the actual velocities and the average velocity of said geophysical signals whereby said roller and said chart are driven at a variable speed proportional to the actual velocities of said geophysical signals in the ground, whereby said chart is driven at a variable speed substantially proportional to the actual velocities of said geophysical signals in the ground.

2. An apparatus as set forth in claim 1 further including means including gear means for making both coarse and fine adjustments in said first drive input means.

3. An apparatus as set forth in claim 1 further including means including a rotatable depth drum provided with a slotted periphery and longitudinally spaced from said paper drive roller to provide depth lines on said chart.

4. An apparatus as set forth in claim 3 further including means to vary the time at which said function generator in said second drive input means becomes operative.

5. An apparatus as set forth in claim 1 further including braking means associated with said second drive input means to remove backlash in said second drive input means.

6. An apparatus as set forth in claim 5 wherein said second drive input means includes a cam and cam follower.

7. An apparatus as set forth in claim 1 wherein said second drive input means includes a cam and cam follower.

8. An apparatus as set forth in claim 7 further including means to change the effective lift of said cam to permit the use of the same function generator for various geophysical trace depths.

9. An apparatus as set forth in claim 1 further including means to vary the time at which said function generator in said second drive input means becomes operative.

10. An apparatus as set forth in claim 9 further including a rotatable depth drum provided with a slotted periphery and longitudinally spaced from said paper drive roller to provide depth lines on said chart.

11. An apparatus as set forth in claim 10 further including clutch means to prevent rotation of said depth drum until said function generator becomes operative.

12. In an apparatus for recording geophysical signals travelling at predetermined actual velocities, the combination comprising a paper drive roller, a chart driven by said roller, a differential having first and second inputs, an output connected to said roller for driving said roller, a first drive input means to said differential to drive said first input at a speed proportional to a first velocity function of said geophysical signals in the ground, and a second drive input means to said second input including a function generator to drive said second input at a predetermined variable speed proportional to the difference in speed between said actual velocities and said first velocity function, said difference in speed being a second velocity function of said geophysical signals in the ground, whereby said roller and chart are driven at a variable speed substantially proportional to the actual velocities of said geophysical signals in the ground.

13. An apparatus as set forth in claim 12 wherein said first velocity function is a constant velocity function and said second velocity function is an acceleration function.

14. The apparatus as claimed in claim 13 in which said function generator is a cam.

15. An apparatus as set forth in claim 12 wherein said first velocity function is a constant velocity function and said second velocity function is a variable velocity function.

16. An apparatus as set forth in claim 15 further including clutch means to disengage said function generator from said first drive input means.

17. An apparatus as set forth in claim 15 further including means including a depth drum to provide depth lines on said chart, a shaft longitudinally spaced from said control shaft on which said depth drum is mounted, driving means for driving said depth drum shaft from said control shaft, a slip clutch on said depth drum shaft, and means for releasably holding said depth drum shaft.

18. The aparatus as claimed in claim 17 in which a relay prevents rotation of said depth drum shaft until said relay is energized.

19. In an apparatus for recording geophysical signals travelling at predetermined actual velocities, the combination comprising a paper drive roller, a chart driven by said roller, a control shaft for driving said roller, a differential having an output for driving said control shaft proportionally to the actual velocities of said geophysical signals in the ground, drive means coupled to said differential to supply a first input of constant velocity to a first input of said differential, a second input means to said differential including function generator for providing an input proportional to the difference in speed between the actual velocities and said constant velocity, an acceleration responsive member mounted on a second shaft, said second shaft driving said control shaft responsive to said second input to said differential, an intermediate shaft coupling said function generator and said second shaft, said intermediate shaft provided with a member of such such shape as to permit variations in the magnitude and character of the output of said acceleration responsive means.

20. The apparatus as claimed in claim 19 in which said acceleration responsive member is a circular wheel.

21. The apparatus claimed in claim 19 in which said acceleration responsive member and said member on said intermediate shaft are circular wheels of different diameters.

22. The apparatus as claimed in claim 19 in which a flexible tape connects said acceleration responsive member and said member on said intermediate shaft.

23. The apparatus as claimed in claim 19, in which said acceleration responsive member comprises a second function generator to complement the output of said first function generator.

24. An apparatus as set forth in claim 19 further including a multi-speed gear transmission between said second shaft and said differential to provide a coarse control of the output of said acceleration responsive member.

25. The apparatus as claimed in claim 19 in which said acceleration responsive member and said member on said intermediate shaft are provided with spiral peripheries of different sizes.

26. The apparatus as claimed in claim 25 in which means are provided to permit an initial rotation of said acceleration responsive member with respect to said member on said intermediate shaft to effect a vernier control over the output of said acceleration responsive member to said differential.

27. The apparatus as claimed in claim 26 in which a flexible tape permits an initial rotation of said acceleration responsive member with respect to said member on said intermediate shaft.

28. The apparatus as claimed in claim 26 in which the displacement of a pulley positioned between said second shaft and said intermediate shaft causes an initial rotation of said acceleration responsive member with respect to said member on said intermediate shaft.

References Cited in the file of this patent

UNITED STATES PATENTS

| | | |
|---|---|---|
| 1,270,964 | McCloud | July 2, 1918 |
| 1,489,782 | Newell | Apr. 8, 1924 |
| 1,740,788 | Sheridan | Dec. 24, 1929 |
| 2,163,746 | Courtois-Suffit et al. | June 27, 1939 |
| 2,326,219 | Hayward | Aug. 10, 1943 |
| 2,490,461 | McKinney | Dec. 6, 1949 |
| 2,521,130 | Scherbatskoy | Sept. 5, 1950 |
| 2,604,955 | Hawkins | July 29, 1952 |
| 2,638,402 | Lee | May 12, 1953 |
| 2,697,648 | Kerr et al. | Dec. 21, 1954 |
| 2,821,892 | Merten | Feb. 4, 1958 |
| 2,858,523 | Hawkins | Oct. 28, 1958 |
| 2,963,555 | Brubaker | Dec. 6, 1960 |
| 3,005,056 | Goldmark et al. | Oct. 17, 1961 |